Oct. 23, 1934.  G. F. THOMAS ET AL  1,977,654
LUBRICATING APPARATUS
Filed Feb. 13, 1932    3 Sheets-Sheet 3
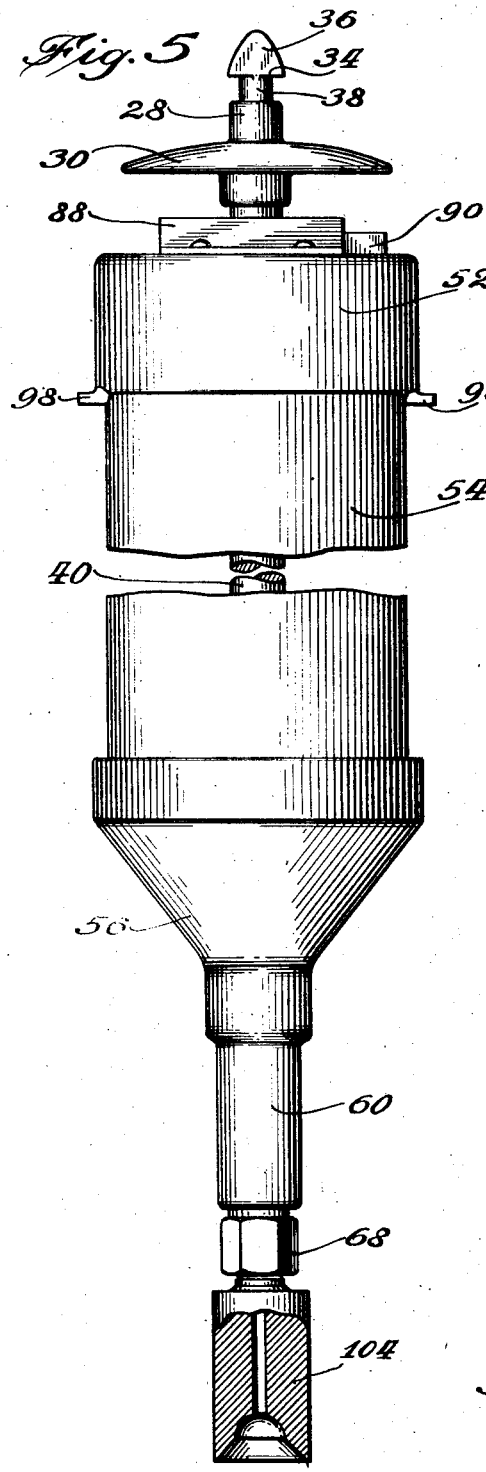
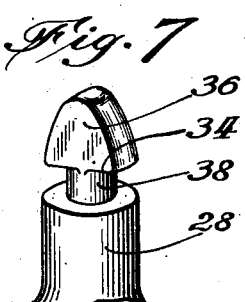
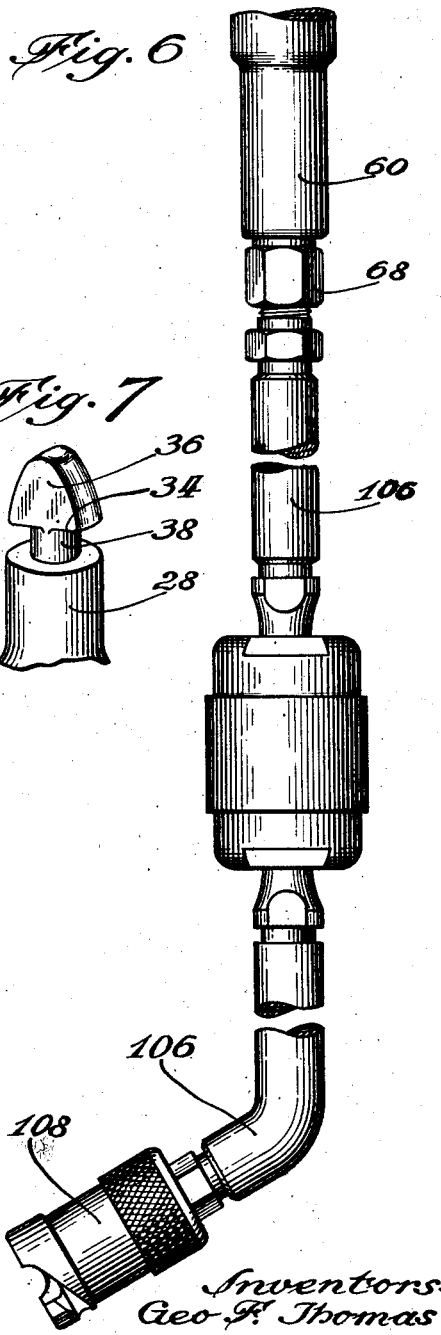
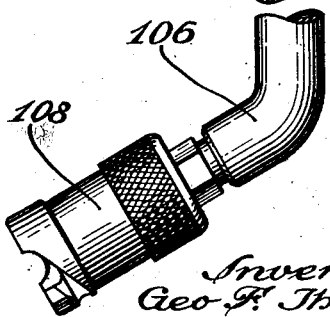
Inventors:
Geo. F. Thomas
Joseph Bystricky
By Williams, Bradbury,
McCaleb & Hinkle.
Attys.

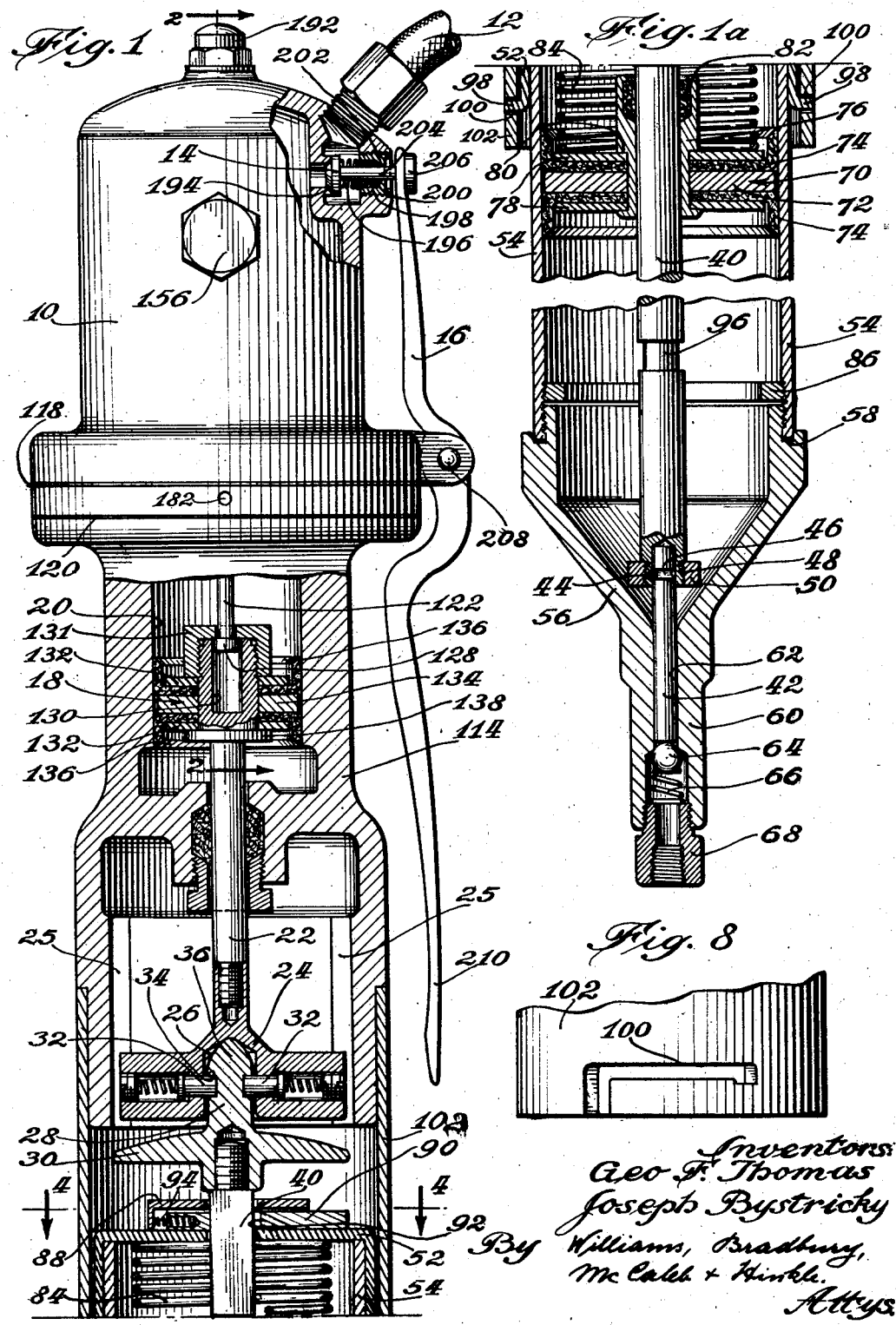

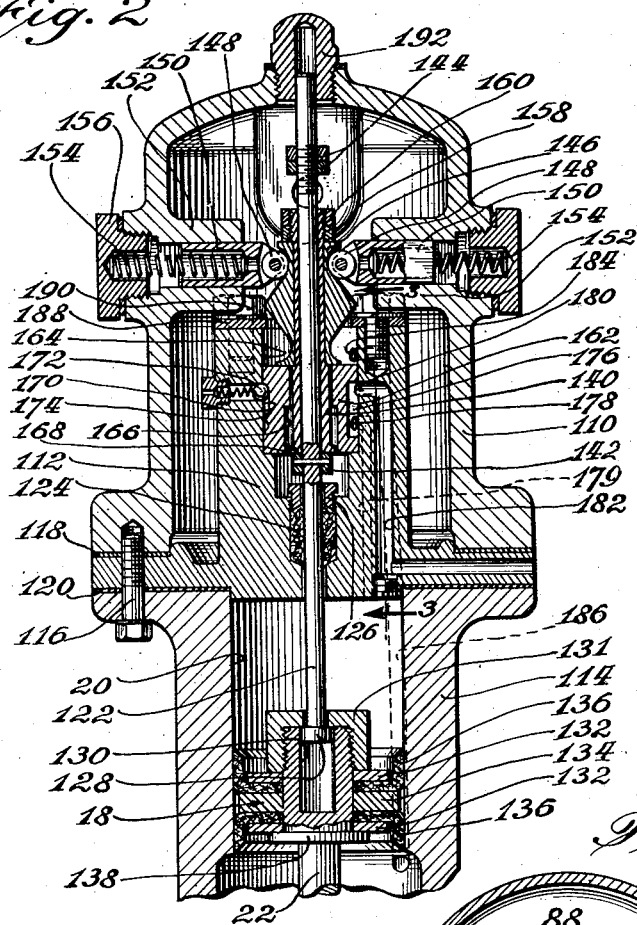
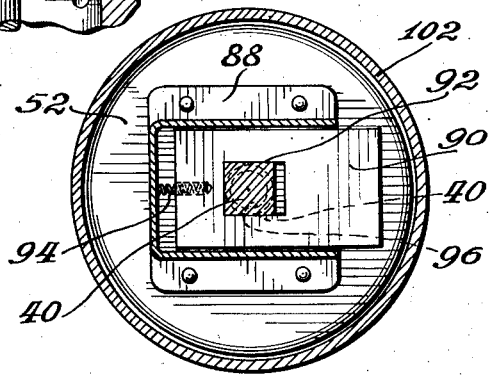
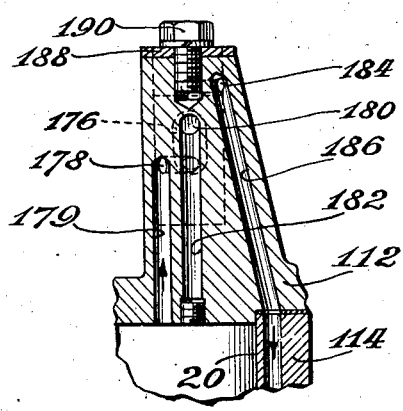

Patented Oct. 23, 1934

1,977,654

UNITED STATES PATENT OFFICE 1,977,654

LUBRICATING APPARATUS

George F. Thomas, Riverside, and Joseph Bystricky, Chicago, Ill., assignors to Alemite Corporation, Chicago, Ill., a corporation of Delaware Application February 13, 1932, Serial No. 592,680

9 Claims. (Cl. 221—47.3)

Our invention relates generally to high pressure lubricating apparatus, and more particularly to improvements in grease guns especially adapted for the lubrication of automobiles and similar machinery.

In the lubrication of automobiles, it is desirable to lubricate the various parts, such as spring shackles, water pump, steering gear and universal joint, with different kinds of lubricant. In the past it has been customary for the service station to be provided with a plurality of hand-operated grease guns, each containing a different kind of lubricant. Due to the many different kinds of lubricant required, it was not feasible to utilize a power-operated compressor for each type of lubricant. The hand-operated grease guns, to the use of which the usual automobile service station was limited by reason of cost, greatly increased the labor of properly lubricating an automobile or similar machine and imposed a limitation upon the degree of pressure at which the lubricant could be forced into the bearings. In our invention these difficulties are overcome by providing a suitable power-operated grease gun operating mechanism to which a grease gun may be detachably secured. Thus a service station, by acquiring this power mechanism for operation of the grease guns, may utilize small auxiliary grease guns containing the various different kinds of lubricants to supply the particular bearings where such special lubricants are required.

We accomplish this result by providing a special grease gun similar in many respects to the ordinary hand-operated grease gun, but adapted for quick detachable connection with the power-operated grease gun actuating mechanism, the latter being in the alternative form disclosed herein, a suitable compressed air operated motor. It will, however, be apparent to those skilled in the art that an electric motor, hydraulic motor, or other suitable power means may be utilized, if desired.

From the foregoing it will appear that it is an object of my invention to provide an improved lubricating system and apparatus in which a grease gun may be detachably secured to a motor to be operated thereby.

A further object is to provide an improved means for detachably connecting a grease gun to a power-operated actuating mechanism therefor.

A further object is to provide an improved grease gun which may be manually operated or may be detachably connected to a power-operated motor for actuation thereby.

A further object is to provide an improved grease gun.

A further object is to provide an improved grease gun and pneumatically operated motor therefor in which the exhaust from the motor is utilized to force the grease into the pressure cylinder of the grease gun.

A further object is to provide an improved grease gun and motor which may be easily operated, is simple in construction, and may be economically manufactured.

Other objects will appear from the following description, reference being had to the accompanying drawings, in which Figures 1 and 1a are elevational and central vertical sectional views of the motor portion and grease gun portion, respectively, of the lubricating apparatus of our invention.

Figure 2 is a central vertical sectional view of the major portion of the compressed air motor, taken on the line 2—2 of Fig. 1.

Figure 3 is a fragmentary sectional view taken on the line 3—3 of Fig. 2.

Figure 4 is a transverse sectional view taken on the line 4—4 of Fig. 1.

Figure 5 is an elevational view of the grease gun, a portion of the nozzle for pressure contact coupling with a lubricant receiving fitting being shown in section.

Figure 6 is an elevational view of an articulated hose and coupling attached to the discharge end of the grease gun for connecting the latter to a lubricant receiving fitting having a cross pin.

Figure 7 is a perspective view of the end projection on the handle of the grease gun.

Fig. 8 is an elevational view of the lower end of the tubular motor housing showing the bayonet connecting slot.

As best illustrated in Figs. 1 and 1a, the apparatus of our invention comprises an air motor housing 10 to which air under pressure is supplied by a conduit 12, the flow to the air motor being controlled by a suitable spring pressed valve 14 which may be opened by means of an operating lever 16. The air motor includes a piston 18 reciprocable in a cylinder 20. By suitable valve mechanism, hereinafter to be described, air under pressure is alternately admitted to and discharged from the cylinder 20 upon the opposite sides of the piston 18 so as to reciprocate the latter.

The piston is carried by a stem 22 which, at its lower end, carries a handle catch 24. The latter is provided with a central recess 26 adapted to receive the end projection 28 of a grease gun handle 30 and having a pair of spring pressed latches 32 slidable therein for engagement beneath shoulders 34 formed by a head 36 at the extremity of the end projection 28. As best illustrated in Fig. 7, the head 36 is in the form of a paraboloid having sections thereof cut away in parallel planes tangential to the cylindrical neck portion 38. The handle 30 is threaded to a plunger rod 40, the upper end of which, as shown in Figs. 1 and 4, is square in cross section, and the lower portion of which, as shown in Fig. 1a, is of circular cross section. A plunger 42 is loosely secured to the lower end of the plunger rod 40 by means of a pin 44 which is in engagement with an annular groove 46 formed adjacent the upper end of the plunger and which passes through the threaded lower extremity 48 of the plunger rod 40. A nut 50 holds the pin 44 in place. The plunger rod 40 is guided in a cap 52, which is rigidly and substantially permanently secured to the barrel 54 of the grease gun.

A head 56 is threaded to the lower end of the barrel 54, a gasket 58 being provided to form a lubricant tight seal at this point. The head 56 is provided with a nozzle extension 60 which has a central axial bore 62 to receive the plunger 42 and form the high pressure pumping cylinder. The lower end of the cylindrical bore 62 is normally closed by an outlet check valve 64 held against its seat by a spring 66, the latter being seated on a bushing 68 threaded in the end of the nozzle extension 60.

A follower 70, comprising a backing plate 72 and a pair of opposed cup leathers 74, is held in assembled relation on a sleeve 76. The backing plate 72, cup leathers 74, and face plates 78 are held in assembled relation against a shoulder 80 formed on the sleeve 76 by having the lower end of the sleeve riveted over the lower face plate 78, as illustrated in Fig. 1a. A suitable packing 82 is preferably provided to form a sliding seal between the sleeve 76 and plunger rod 40. A spring 84 is compressed between the cap 52 and the follower 70 and normally exerts a downward pressure upon the latter. A ring 86 threaded in the lower end of the barrel 54 limits downward movement of the piston. The upper end of the plunger rod 40, which is square in cross section, is guided in a correspondingly shaped hole formed in the cap 52 and in a slide guide bracket 88 (Fig. 4). A follower lock 90, in the form of a rectangular plate having a rectangular opening 92 formed therein, is mounted for lateral sliding movement within the bracket 88, being normally pressed to the right (Fig. 4) by a spring 94. The rectangular opening 92 encompasses the plunger rod 40. When the latter is drawn outwardly a sufficient distance, the slide 90 will be moved to the right by the spring 94 and engage within a groove 96 (Fig. 1a) near the lower end of the plunger rod 40, thereby holding the plunger rod against inward movement. While the plunger rod is being retracted, the sleeve 76 will be in engagement with the nut 50 and carry the follower 70 upwardly for convenient filling of the barrel.

The cap 52 is provided with a pair of radially projecting lugs 98 which are adapted to be engaged in bayonet slots 100 (Fig. 8) formed in a tubular housing 102, which is rigidly secured to the lower end of the body of the air motor. By means of the inter-engagement of the lugs 98 with the bayonet slots 100, a grease gun containing the desired lubricant may readily be detachably secured to the air motor. During the operation of connecting the grease gun with the air motor, the head 36 of the end projection 28 will pass between the spring pressed latches 32, and when the gun is rotated to complete the engagement of the lugs 98 in the bayonet slots 100, the latches 32 will engage beneath the shoulders 34 and thereby form a driving connection between the piston rod 22 and plunger rod 40 so that the latter will be operated by reciprocation of the air piston 18.

As illustrated in Figs. 5 and 6, any suitable nozzle or coupler may be secured to the bushing 68 for quick detachable connection with a lubricant receiving fitting. In Fig. 5, a nozzle 104 is shown threaded in the bushing 68 for making connection with a fitting of the pressure contact type, while in Fig. 6, an articulated hose 106 terminating in a bayonet slot coupler 108 is illustrated as threaded into the bushing 68 for coupling the grease gun to a lubricant receiving fitting of, the tubular type having a cross pin customarily termed a "pin fitting".

As previously intimated, any suitable means may be utilized to operate the grease gun. As one form of such means we have illustrated in Fig. 2 a compressed air motor for accomplishing this purpose. The motor comprises a head casting 110, a valve chamber casting 112, and a body casting 114, secured together by means of cap screws 116, suitable gaskets 118 and 120 being interposed between these castings to prevent leakage of air. The casting 112 is axially drilled to receive a valve rod 122, a suitable packing 124 and packing gland 126 being provided to seal the sliding connection. The lower end of the valve rod 122 has a head 128 which fits in a well 130 formed in the enlarged upper end of the rod 22. A cap 131 is threaded over the end of the rod 22 and maintains the face plates 132, backing plate 134, and opposed cup leathers 136 in assembled relation upon the rod 22, compressing the latter against a flange 138 formed on the rod 22.

A valve actuating sleeve 140 is slidably mounted upon the valve rod 122, being limited in its sliding movement relative to the rod by a collar 142 pinned to the rod and a pair of adjusting nuts 144 threaded near the upper end of the rod. A suitable means is provided to cause the sleeve 40 to snap over from its one extreme position to its other extreme position, this means comprising a cam member 146 having a surface of revolution about its axis, the cam having a high point at its mid point and dwell portions adjacent each end. The cam surface of the member 146 is adapted to be engaged by rollers 148 mounted for free rotation at the ends of plungers 150, which are mounted for longitudinal sliding movement in suitable inwardly projecting bosses 152 formed integrally with the head casting 110. The plungers 150 are pressed inwardly by compression coil springs 154 which are seated against plugs 156 threaded in the casting 110. Both the plungers 150 and the plugs 156 are axially bored to make it possible to utilize a relatively long spring. The cam member 146 is held rigidly upon the sleeve 140 by means of a nut 158 and a lock nut 160 threaded on the end of the sleeve 140.

A cylindrical slide valve 162 is slidable within a bore 164 and is counterbored, as indicated at 166, to receive a flange 168 formed at the lower end of sleeve 140. Due to the provision of this counterbore 166, the valve 162 is capable of limited sliding movement relative to the sleeve 140, being limited by engagement of the end wall of the counterbore with the flange 168 at one end of its stroke and by the lower end of the cam member 146 at the other end of its stroke. The slide valve 162 has a longitudinal depression 170 formed at one side for engagement with a spring pressed ball detent 172, the depression 170 having a dwell portion 174 at its lower end. The slide valve 162 is provided with a longitudinal passageway 176, which, upon the usual principle of the "D-slide valve", is adapted alternately to connect a port 178 (which, by passageway 179, leads to the upper end of cylinder 20) with a port 180 (which, through elbow-shaped passageway 182 is connected to the atmosphere), and to connect said port 178 with a source of air under pressure. Similarly, the valve is adapted alternately to connect the port 184 (which, by means of passageway 186, leads to the lower end of cylinder 20) with said port 180 and with the source of air under pressure.

The valve 162 is held within the bore 164 by means of an annular washer 188 secured to the upper end of the valve chamber casting 112 by cap screws 190. The upper extremity of the valve rod 122 is guided in a plug 192 threaded in the upper end of the head casting 110, the plug 192 being readily removable for adjustment of the position of the nuts 144.

The space within the head casting 110 and surrounding the valve casting 112 is under pressure while the air motor is being operated, it being directly connected with the air hose 12 when the valve 14 is opened. The valve 14 (Fig. 1) is held against its seat 194 by means of a spring 196, the spring also serving to hold a packing gland 198 against a suitable packing 200 which is located within a plug 202. The plug 202 forms a guide for the stem 204 of the valve 14. The stem 204 has a button head 206 beneath which is engaged the bifurcated end of the operating lever 16, the latter being pivotally mounted on a lug 208 formed integrally with the head casting 110. The air cylinder casting 114 is of sufficiently small diameter so that it may be readily grasped in the hand of the operator and permit use of the thumb or fingers for depressing the handle 210 of the lever 16.

In operation, the air supply hose 12 is connected to a suitable source of air under pressure, a conventional shut-off valve being provided in this air line to cut off the supply of air to the motor when it is not to be used for some time. To lubricate a bearing the operator selects a grease gun containing the desired kind of lubricant and connects it with the air motor by inserting the cap 52 of the grease gun within the tubular extension 102 of the air motor and engaging the lugs 98 in the bayonet slots 100. The partial relative rotation of the air motor and grease gun incidental to the engagement of the lugs 98 in the bayonet slots causes the shoulders 34 of the head 36 to be moved to a position above the latches 32. During this operation, rotation of the plunger rod 40 relative to the grease gun is of course prevented by the engagement of the squared portion of the rod 40 in the correspondingly shaped hole in the cap 52, and rotation of the piston rod 22 prevented by engagement of the ends of the catch member 24 in guideways 25.

Having thus secured the grease gun to the air motor, the operator will push the grease gun against the lubricant receiving fitting if the pressure contact type of nozzle illustrated in Fig. 5 is utilized, or detachably connect the coupler 108 to the lubricant receiving fitting if the pin fittings are utilized on the automobile or machine to be lubricated. After the connection with the bearing has been completed, the operator will depress the handle 210, thereby opening the valve 14 and permitting flow of air under pressure into the head casting 110. With the parts in the position as shown in Fig. 2, the air under pressure will flow through the port 184 and passageway 186 to the lower end of cylinder 20 and cause upward movement of the piston. During this upward movement of the piston, air from the upper end of the cylinder 20 is exhausted to the atmosphere through the passageway 179, port 178, passageway 176, port 180 and passageway 182.

During the initial portion of the upward movement of the air piston 18, the valve rod 122 will remain stationary, but near the end of the upward movement of the air piston 18 the head 128 will abut the bottom of the well 130, and thereafter the valve rod 122 will be forced upwardly with the air piston. Just prior to the completion of the upward stroke of the air piston, the flange 168 will engage with the end of the counterbore 166 in the valve 162 and move the latter upwardly a minute distance. At this time the ridge of the cam member 146 will be substantially in line with the axes of the rollers 148 and the latter, being pressed inwardly by the springs 154, will snap the cam member 146 (together with the sleeve 140, valve rod 122 and slide valve 162) upwardly, so as to bring the passageway 176 of the slide valve into registry with the ports 180 and 184.

When the valve 162 is in its upper position, air under pressure will be admitted to the upper end of the cylinder 20 and the lower end of the cylinder will be connected to the atmosphere. Therefore, the air piston 18 will be forced downwardly, and near the end of its downward stroke the lower end of the cam member 146 will engage the slide valve 162 and force the latter downwardly, the valve rod being again rapidly snapped downwardly by the spring pressed rollers 148. It will be understood that the parts are so proportioned and adjusted that there will be no "dead center" position of the air motor.

Reciprocation of the air piston 18 causes corresponding reciprocation of the plunger rod 40 and plunger 42. The plunger 42 will be entirely withdrawn from its cylinder 62 at the upper end of its stroke but will be readily guided into the cylinder during the initial portion of the downward stroke due to the fact that the upper end of the cylinder 62 flares outwardly, and due to the fact that the plunger 42 is not rigidly connected to the plunger rod 40 but may move slightly relative thereto. At the upper end of the stroke the spring pressed follower 70 forces lubricant into the high pressure cylinder 62 to prime the latter. Due to the difference in cross sectional areas of the plunger 42 and the air piston 18, lubricant may be ejected under extremely high pressures with the moderate air pressures usually used at service stations.

After the service station operator has completed the lubrication of the bearings requiring one kind of lubricant, he may readily detach the grease container from the air motor assembly merely by rotating it sufficient to disengage the lugs 98 from the bayonet slots 100. During this disengaging operation the head 36 of the end projection of the handle of the grease gun will be rotated so that the shoulders 34 will no longer lie above the plungers 32, thus permitting the grease gun handle to be withdrawn from the latching member 24.

The grease guns may readily be refilled in the following manner. After unscrewing the head 56 from the grease gun barrel 54, the lower end of the latter is plunged into a container of grease and the plunger rod 40 drawn upwardly by means of the handle 30. During this movement, the nut 50 at the lower end of the plunger rod will engage with the follower 70 and draw the latter upwardly, compressing the spring 84. When the piston follower 70 is retracted to its uppermost position, the groove 96 formed in the plunger rod 40 will lie in the plane of the latch 90, which will be forced into said groove by its spring 94, thereby locking the piston follower 70 in position. The grease gun may then be withdrawn from the grease supply and the head 56 replaced. After the head has been screwed securely into the barrel 54, the plunger rod 40 may be released by pushing the latch 90 to the left (Fig. 4), whereupon the follower will be pressed against the grease contained in the barrel 54 and the grease gun again in condition for operation.

If desired, the grease gun may be manually operated by reciprocation of the handle 30. In other respects, the system of our invention has numerous inherent advantages due to its flexibility. The nozzle 104 may easily be removed and the jointed hose shown in Figure 6 attached instead to any one of the grease guns. Furthermore, the pressure and the rate of discharge of any gun may be changed by substituting a larger or smaller diameter plunger 42 and a head 60 having a cylinder of correspondingly larger or smaller diameter.

Various modifications of our invention may be made without departing from the broad principles thereof. For example, the grease gun plunger may be retracted by spring means and the end of the piston rod of the air motor merely abut against the plunger rod to drive it downwardly on the discharge stroke. Similarly, instead of conducting the exhaust from the air motor directly to the atmosphere, it may be conducted to the space above the cap of the grease gun. Thus the exhaust air will slightly raise the pressure in this space and consequently raise the pressure within the grease gun above the piston follower. Thus the action of the spring for the follower may be supplemented by the air pressure or the spring may be omitted and air pressure alone relied upon to force the follower downwardly. It will therefore be apparent to those skilled in the art that, while we have illustrated and described a preferred embodiment of our invention, the above and numerous other modifications may be made without departing from the spirit of the invention, and we do not wish to be limited to the precise details set forth but desire to avail ourselves of all changes within the scope of the appended claims.

We claim:

1. High pressure lubricating apparatus comprising a motor having a reciprocating power transmission element, means to control the operation of said motor, a grease pump comprising a grease container and a pumping mechanism having a reciprocating piston, and cooperating means on said motor and said grease gun operatively to connect the grease container and grease pumping mechanism to said motor by a single manual operation, said last named means including a positive two-way driving connection between said reciprocating element and said piston.

2. In apparatus of the class described, the combination of a power operated motor having a reciprocating driving element, and a grease gun detachably connected to said motor for operation thereby, said grease gun having a plunger reciprocated positively in both directions by said element when the gun is connected to said motor.

3. In apparatus of the class described, the combination of a motor having a reciprocating element, a grease gun comprising a grease container and a reciprocatory ejecting means, and interengaging means on said air motor and said container and on said reciprocatory element and on said ejecting means for detachably coupling said grease gun and air motor in operative relationship, said interengaging means on said element and said ejecting means forming a positive two-direction driving connection between said parts.

4. In apparatus of the class described, the combination of a fluid operated motor having a reciprocatory driving element, a grease gun having reciprocatory ejecting means incorporated therein, bayonet slot means for detachably coupling said grease gun to said motor, and interengaging means for detachably connecting said reciprocatory element with said ejecting means upon rotation of said grease gun relative to said motor incident to coupling it thereto.

5. In a device of the class described, the combination of an air motor having a reciprocatory power transmitting element, a grease gun having means for detachable connection with said air motor, reciprocatory lubricant ejecting means associated with said grease gun, means for latching said ejecting means to said reciprocatory element, and means for preventing rotation of said latching means relative to said grease gun.

6. A grease gun comprising a lubricant reservoir, means for ejecting lubricant therefrom under pressure, a manually engageable handle for manually operating said means, and means associated with said handle for detachably connecting the latter to power means for actuation thereby.

7. In apparatus of the class described, the combination of a fluid pressure operated reciprocating motor, and a grease gun having reciprocatory ejecting means detachably connected to said motor for positive operation thereby in both directions.

8. In apparatus of the class described, the combination of a fluid pressure motor having a reciprocatory driving element, a grease gun having reciprocatory ejecting means incorporated therein, quick detachable connecting means for detachably coupling said grease gun to said motor, and interengaging means for detachably connecting said reciprocatory element with said ejecting means by the movement of said grease gun incident to coupling it to said motor.

9. In a device of the class described, the combination of a fluid operated motor having a reciprocatory power transmitting element, a grease gun having means for detachable connection with said motor, lubricant ejecting means in said grease gun, and means for latching said ejecting means to said reciprocatory element.

GEORGE F. THOMAS.
JOSEPH BYSTRICKY.